(12) United States Patent
Tanaka et al.

(10) Patent No.: US 9,337,502 B2
(45) Date of Patent: May 10, 2016

(54) FUEL CELL SYSTEM AND CONTROL METHOD AT STARTING IN THE FUEL CELL SYSTEM

(75) Inventors: Hiromi Tanaka, Toyota (JP); Osamu Yumita, Nagoya (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 755 days.

(21) Appl. No.: 13/379,540

(22) PCT Filed: Jun. 22, 2009

(86) PCT No.: PCT/JP2009/061312
§ 371 (c)(1),
(2), (4) Date: Dec. 20, 2011

(87) PCT Pub. No.: WO2010/150337
PCT Pub. Date: Dec. 29, 2010

(65) Prior Publication Data
US 2012/0107706 A1 May 3, 2012

(51) Int. Cl.
*H01M 8/06* (2006.01)
*H01M 8/04* (2006.01)

(52) U.S. Cl.
CPC ........ *H01M 8/0441* (2013.01); *H01M 8/04253* (2013.01); *H01M 8/04268* (2013.01); *H01M 8/04358* (2013.01); *H01M 8/04425* (2013.01); *H01M 8/04559* (2013.01); *H01M 8/04649* (2013.01); *H01M 8/04776* (2013.01); *H01M 8/04955* (2013.01); *H01M 8/04402* (2013.01); *H01M 2250/20* (2013.01); *Y02E 60/50* (2013.01); *Y02T 90/32* (2013.01)

(58) Field of Classification Search
CPC combination set(s) only.
See application file for complete search history.

(56) References Cited

FOREIGN PATENT DOCUMENTS

| | | | |
|---|---|---|---|
| JP | 2006-164736 A | | 6/2006 |
| JP | 2007-128698 A | | 5/2007 |
| JP | 2007-184202 A | | 7/2007 |
| JP | 2007-317680 A | | 12/2007 |
| JP | 2008-198439 A | | 8/2008 |
| JP | 2008198439 A | * | 8/2008 |
| JP | 2008-300218 A | | 12/2008 |
| JP | 2008300218 A | * | 12/2008 |
| JP | 2009-004243 A | | 1/2009 |
| JP | 2009004243 A | * | 1/2009 |
| JP | 2009-054427 A | | 3/2009 |

OTHER PUBLICATIONS

International Search Report mailed Jul. 21, 2009 of PCT/JP2009/061312.

* cited by examiner

*Primary Examiner* — Daniel Gatewood
(74) *Attorney, Agent, or Firm* — Kenyon & Kenyon LLP

(57) ABSTRACT

A fuel cell system includes a fuel cell stack and a fuel gas piping system which supplies a fuel gas to the fuel cell stack, and is capable of, at starting below a freezing point, selectively performing a rapid warm-up operation to generate electric power at an air stoichiometric ratio lower than that at starting at ordinary temperature, while revolving a circulating pump, and the fuel cell system further includes a clogging determination unit which determines whether or not clogging arises from freezing in a fuel gas passage of the fuel cell stack, or the fuel gas piping system, wherein when the clogging arises, the circulating pump is stopped in the rapid warm-up operation, and termination conditions of the rapid warm-up operation are changed in accordance with a clogging volume.

7 Claims, 5 Drawing Sheets

FUEL CELL SYSTEM AND CONTROL METHOD AT STARTING IN THE FUEL CELL SYSTEM

This is a 371 national phase application of PCT/JP2009/061312 filed 22 Jun. 2009, the contents of which are incorporated herein by reference.

TECHNICAL FIELD

The present invention relates to a fuel cell system and a control method at starting in the system, and more particularly, it relates to starting control in a case where a temperature of a fuel cell stack is below a freezing temperature of water (below a freezing point).

BACKGROUND ART

In a case where it is detected that a temperature of a fuel cell stack is below a freezing temperature (below a freezing point) of water when a fuel cell system is started, a control map for normal starting is changed to a control map for starting below the freezing point, and the fuel cell is started along the map for the starting below the freezing point. There is an art that startability is improved by performing, in this case, a rapid warm-up operation which rapidly raises a temperature at an electric power generation part to exceed the temperature below the freezing point.

The rapid warm-up operation (electric power generation at low efficiency) means electric power generation in which a volume of a reactant gas supplied to a fuel cell is smaller than that in normal electric power generation, and an electric power loss is larger than that in the normal electric power generation, to operate the fuel cell in a state of a reduced air stoichiometric ratio. The fuel cell can rapidly be warmed up by intentionally setting the electric power loss to be larger in this way. On the other hand, in the case of the normal electric power generation, the fuel cell is operated in a state where the air stoichiometric ratio is set to a predetermined value or higher so that high electric power generation efficiency can be obtained by suppressing the electric power loss.

PRIOR ART REFERENCES

Patent Documents

[Patent Document 1] JP-2007-128698 A
[Patent Document 2] JP-2006-164736 A
[Patent Document 3] JP-2007-184202 A

SUMMARY OF THE INVENTION

Problem to be Solved by the Invention

In a conventional rapid warm-up operation at starting below a freezing point, the operation is started in a state where an anode gas circulating pump is revolved, in order to uniformly perform electric power generation, the reason for which is that durability is improved by making a hydrogen gas distribution in the fuel cell uniform.

However, when there is a cell occluded by freezing in an anode flow path, hydrogen is successively consumed from the gas flowing into the occluded cell, and hence nitrogen which is an impurity deposits finally. For this reason, there may be caused a phenomenon that a cell voltage lowers owing to lack of hydrogen and that the starting cannot be performed.

The anode gas circulating pump may be stopped in order to improve startability by preventing this phenomenon, but then there is a problem that the durability deteriorates as mentioned above.

The invention has an object, in view of the circumstances mentioned above, of providing a fuel cell system which can simultaneously prevent the deterioration of durability and the deterioration of startability, and a control method at starting in the system.

Means for Solving the Problem

A fuel cell system of the invention is directed to a fuel cell system comprising: a fuel cell stack which is supplied with a fuel gas and an oxidation gas to generate electric power by an electrochemical reaction; an oxidation gas piping system which supplies the oxidation gas to the fuel cell stack; and a fuel gas piping system which supplies the fuel gas to the fuel cell stack, the fuel gas piping system including a supply path through which the fuel gas to be supplied to the fuel cell stack from a fuel gas supply source flows; a circulation path which returns a fuel off-gas discharged from the fuel cell stack to the supply path; and a circulating pump which feeds under pressure the fuel off-gas in the circulation path to the supply path, the fuel cell system being capable of, at starting below a freezing point, selectively performing a rapid warm-up operation to generate the electric power at an air stoichiometric ratio lower than that at starting at ordinary temperature, while revolving the circulating pump, the fuel cell system further comprising: a clogging determination unit which determines, at the starting below the freezing point, whether or not clogging arises from freezing in a fuel gas passage of the fuel cell stack, or the fuel gas piping system; and a rapid warm-up controller which, when it is determined that the clogging arises, stops the circulating pump in the rapid warm-up operation, and changes termination conditions of the rapid warm-up operation in accordance with a degree of the clogging.

As described later, when termination is determined based on the termination conditions of the rapid warm-up operation, for example, a fuel cell temperature, a determination reference value thereof is changed between, for example, a case where the fuel gas piping system is clogged or cells of a large part of the fuel cell stack are clogged and a case where an only small number of cells of the fuel cell stack are clogged. In consequence, a time to stop an operation of the circulating pump can be optimized in accordance with the degree of the clogging, and also the deterioration of startability can be suppressed.

The rapid warm-up controller can continue the rapid warm-up operation until the fuel cell stack reaches a higher temperature, when the degree of the clogging is larger.

The degree of the clogging may be determined by classifying a clogging state into at least two levels.

One of the clogging states can be determined by judging whether or not the circulating pump revolves normally when a revolution instruction is given to the circulating pump. For example, when a revolution deviation between an instructed revolution number and an actual revolution number or assumed electric power consumption relative to the instructed revolution number is beyond a predetermined reference value, the actual revolution number does not rise relative to the revolution instruction in accordance with the instruction, and hence it can be determined that the fuel gas piping system or the cells of the large part of the fuel cell stack are clogged.

Another clogging state can be determined by a drop in cell voltage of the fuel cell stack, when the rapid warm-up operation is performed. In a case where the cell voltage drops below a predetermined value within a predetermined time, it can be determined that the cell is clogged. Moreover, also in a case where a drop gradient of the cell voltage is larger than a predetermined value, it can be determined that the cell is clogged.

In these cases, the degree of the clogging is not so remarkable as that in the case where the fuel gas piping system is clogged or the cells of the large part of the fuel cell stack are clogged as described above, and hence it can be determined that the small number of cells of the fuel cell stack are clogged, and the termination conditions of the rapid warm-up operation can be varied (e.g. relaxed) as described above.

The rapid warm-up controller may limit an amount of heat to be generated by the fuel cell stack, and an absolute value and an increase rate of a generated current of the fuel cell stack, while the circulating pump is stopped. While the circulating pump is stopped, electric power generation is non-uniformly performed, a temperature distribution enlarges, and durability might deteriorate, so that the above limitations are imposed to suppress a rise of a pressure of the fuel gas to be supplied to the fuel cell stack, thereby suppressing the deterioration of durability.

Advantages of the Invention

According to the invention, a time to stop a circulating pump can be optimized in accordance with a clogging state in a fuel gas piping system or a fuel cell stack. Consequently, startability can be improved while suppressing the deterioration of durability.

MODE FOR CARRYING OUT THE INVENTION

Hereinafter, a fuel cell system according to a preferable embodiment of the invention will be described with reference to the accompanying drawings. It is to be noted that although the fuel cell system of the present embodiment can be mounted on a vehicle such as a fuel cell vehicle (FCHV), the invention is not limited to such an application example, but can be applied to various moving bodies such as a ship, an airplane, a train and a walking robot, and can be applied also to a stationary electric power generation system in which a fuel cell is used as, for example, electric power generation equipment for a structure (a house, a building, etc.).

Figure 1:
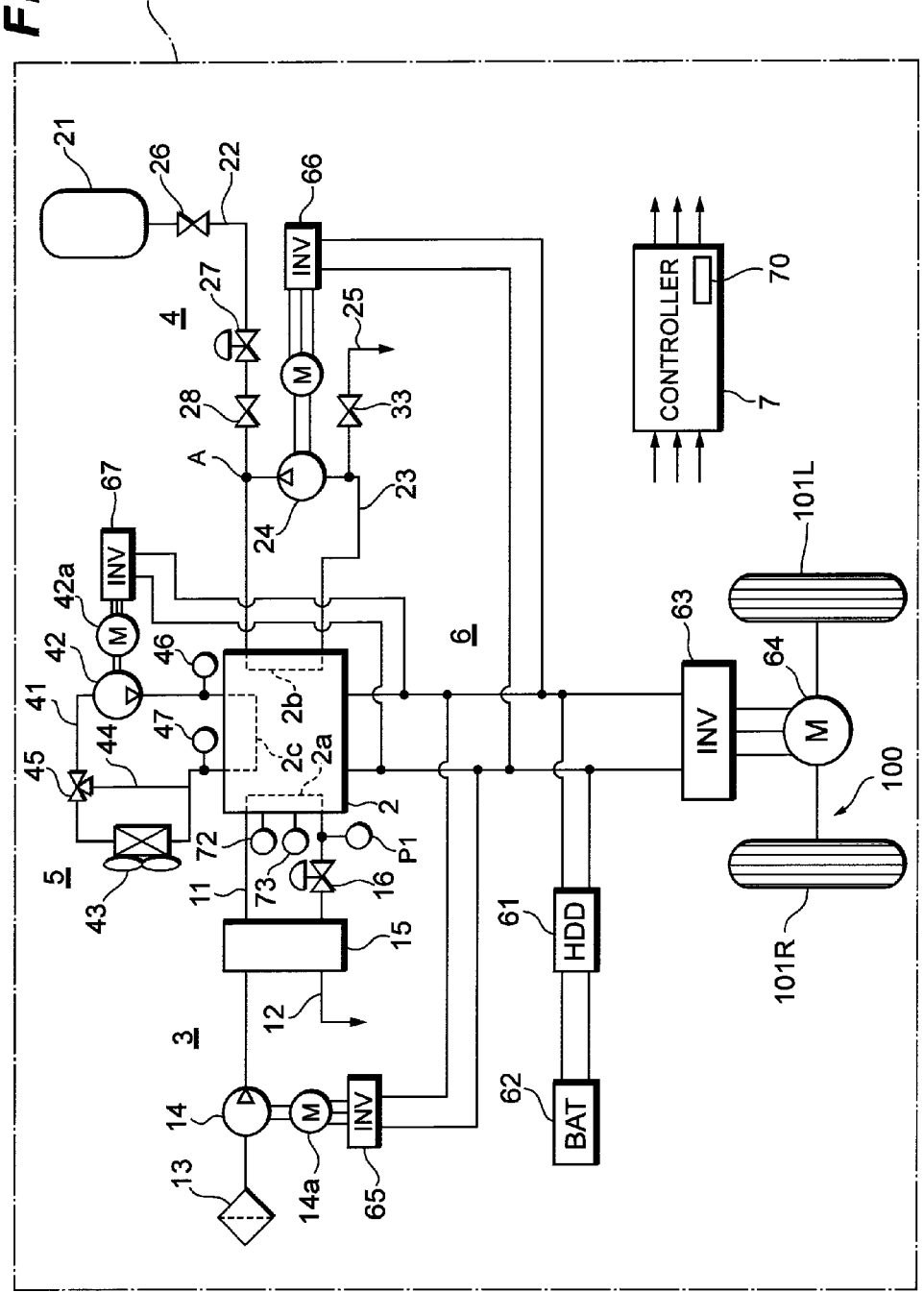
FIG. 1 is a block diagram of a fuel cell system according to one embodiment of the invention.

A fuel cell system 1 shown in FIG. 1 includes a fuel cell 2, an oxidation gas piping system 3 which supplies air (oxygen) as an oxidation gas to the fuel cell 2, a fuel gas piping system 4 which supplies a hydrogen gas as a fuel gas to the fuel cell 2, a refrigerant piping system 5 which supplies a refrigerant to the fuel cell 2 to cool the fuel cell 2, an electric power system 6 which charges/discharges electric power of the system 1, and a controller 7 (a clogging determination unit and a rapid warm-up controller) which integrally controls the whole system.

The fuel cell 2 is of, for example, a solid polymer electrolyte type, and includes a stack structure (a cell stack) in which a large number of single cells are stacked. The single cell has an air electrode (a cathode) on one surface of the electrolyte made of an ion exchange membrane, has a fuel electrode (an anode) on the other surface of the electrolyte, and further has a pair of separators so as to sandwich the air electrode and the fuel electrode from both sides. The oxidation gas is supplied to an oxidation gas passage 2a of one separator, and the fuel gas is supplied to a fuel gas passage 2b of the other separator. The fuel cell 2 generates the electric power by an electrochemical reaction of the supplied fuel gas and oxidation gas.

The oxidation gas piping system 3 includes a supply path 11 through which the oxidation gas to be supplied to the fuel cell 2 flows, a discharge path 12 through which an oxidation off-gas discharged from the fuel cell 2 flows, and a bypass path 17 through which the oxidation gas flows while bypassing the fuel cell 2. A downstream end of the supply path 11 communicates with an upstream end of the oxidation gas passage 2a, and an upstream end of the discharge path 12 communicates with a downstream end of the oxidation gas passage 2a. Moreover, the oxidation off-gas has a highly wet state because the gas includes moisture generated by a cell reaction of the fuel cell 2.

The supply path 11 is provided with a compressor 14 which takes in the oxidation gas (outside air) through an air cleaner 13, and a humidifier 15 which humidifies the oxidation gas fed under pressure to the fuel cell 2 by the compressor 14. The humidifier 15 exchanges the moisture between the oxidation gas flowing through the supply path 11 and having the highly wet state and the oxidation off-gas flowing through the discharge path 12 and having a low wet state, to adequately humidify the oxidation gas to be supplied to the fuel cell 2.

A back pressure of the oxidation gas to be supplied to the fuel cell 2 is regulated by a pressure regulating valve 16 disposed in the discharge path 12 in the vicinity of a cathode outlet. In the vicinity of the pressure regulating valve 16, a pressure sensor P1 which detects a pressure in the discharge path 12 is provided. The oxidation off-gas is finally discharged as an exhaust gas through the pressure regulating valve 16 and the humidifier 15 into the atmosphere outside the system.

The fuel gas piping system (the anode flow path system) 4 includes a hydrogen supply source 21, a supply path 22 through which a hydrogen gas to be supplied to the fuel cell 2 from the hydrogen supply source 21 flows, a circulation path 23 which returns a hydrogen off-gas (a fuel off-gas) discharged from the fuel cell 2 to a joining part A of the supply path 22, a hydrogen pump 24 (a gas circulating pump) which feeds under pressure the hydrogen off-gas in the circulation path 23 to the supply path 22, and a purge path 25 branch-connected to the circulation path 23. The hydrogen gas which flows out from the hydrogen supply source 21 to the supply path 22 by opening a main valve 26 is supplied to the fuel cell 2 through a pressure reducing valve such as a pressure regulating valve 27, and a shutoff valve 28. The purge path 25 is provided with a purge valve 33 which discharges the hydrogen off-gas to a hydrogen dilution device (not shown).

The refrigerant piping system 5 includes a refrigerant flow path 41 which communicates with a cooling passage 2c in the fuel cell 2, a cooling pump 42 provided in the refrigerant flow path 41, a radiator 43 which cools the refrigerant discharged from the fuel cell 2, a bypass flow path 44 which bypasses the radiator 43, and a switching valve 45 which sets the flow of a cooling water through the radiator 43 and the bypass flow path 44. The refrigerant flow path 41 includes a temperature sensor 46 provided in the vicinity of a refrigerant inlet of the fuel cell 2, and a temperature sensor 47 provided in the vicinity of a refrigerant outlet of the fuel cell 2.

The refrigerant temperature detected by the temperature sensor 47 reflects an inner temperature of the fuel cell 2 (hereinafter referred to as the FC temperature). It is to be noted that the temperature sensor 47 may detect a component temperature around the fuel cell (a concerned temperature of the fuel cell) or an outside air temperature around the fuel cell (the concerned temperature of the fuel cell), instead of (or in addition to) the refrigerant temperature. Moreover, the cooling pump 42 circulates and supplies the refrigerant in the refrigerant flow path 41 to the fuel cell 2 by motor drive.

The electric power system 6 includes a high voltage DC/DC converter 61, a battery 62, a traction inverter 63, a traction motor 64, and various auxiliary inverters 65, 66 and 67. The high voltage DC/DC converter 61 is a direct current voltage converter, and has a function of regulating a direct current voltage input from the battery 62 and outputting the voltage to a traction inverter 63 side, and a function of regulating a direct current voltage input from the fuel cell 2 or the traction motor 64 and outputting the voltage to the battery 62. The charge/discharge of the battery 62 is realized by these functions of the high voltage DC/DC converter 61. Moreover, an output voltage of the fuel cell 2 is controlled by the high voltage DC/DC converter 61.

The battery (the storage battery) 62 is a chargeable/dischargeable secondary battery, and includes, for example, a nickel hydrogen battery or the like. In addition, various types of secondary batteries can be applied. Instead of the battery 62, a chargeable/dischargeable storage battery except the secondary battery, for example, a capacitor may be used.

The traction inverter 63 converts a direct current into a three-phase alternating current, and supplies the current to the traction motor 64. The traction motor 64 (the motive power generator) is, for example, a three-phase alternating current motor. The traction motor 64 serves as a main motive power source of, for example, a vehicle 100 on which the fuel cell system 1 is mounted, and is coupled with wheels 101L and 101R of the vehicle 100. The auxiliary inverters 65, 66 and 67 control the driving of motors of the compressor 14, the hydrogen pump 24 and the cooling pump 42, respectively.

The controller 7 is constituted as a microcomputer including a CPU, an ROM and an RAM inside. The CPU executes desired calculation in accordance with a control program, to perform various types of processing and control such as the control of a normal operation and the control of a warm-up operation described later. The ROM stores the control program and control data which are processed by the CPU. The RAM is used mainly as various working areas for the control processing.

A timer 70, a voltage sensor 72 and a current sensor 73 are connected to the controller 7. The timer 70 measures various times required for controlling the operation of the fuel cell system 1. The voltage sensor 72 detects the output voltage of the fuel cell 2 (the FC voltage). Specifically, the voltage sensor 72 detects the voltage generated by all the single cells of the fuel cell 2 (hereinafter, referred to as the cell voltage). In consequence, the state of each single cell of the fuel cell 2 is grasped. The current sensor 73 detects an output current of the fuel cell 2 (the FC current).

The controller 7 inputs detection signals from various sensors such as the pressure sensor P1 and the temperature sensors 46 and 47 used for the gas system (the oxidation gas piping system 3 and the fuel gas piping system 4) and the refrigerant system 5, an outside air temperature sensor 51 for detecting an outside air temperature of an environment where the fuel cell system 1 is placed, and an accelerator pedal opening sensor for detecting an accelerator pedal opening of the vehicle 100, to output control signals to constituent elements (the compressor 14, the pressure regulating valve 16, a bypass valve 18, etc.). Moreover, the controller 7 performs the diagnosis of the moisture of the fuel cell 2, and the like at a predetermined timing, and controls the moisture of the fuel cell 2 based on a diagnosis result.

In the present embodiment, at starting (e.g. at the starting below a freezing point) of the fuel cell system 1, electric power generation at low efficiency is performed as needed so that a volume of a reactant gas supplied to the fuel cell 2 is smaller than that during normal electric power generation and that an electric power loss is larger than that during the normal electric power generation, thereby performing rapid warming-up. Here, the electric power generation at low efficiency means the electric power generation in which the volume of the reactant gas (the oxidation gas in the present embodiment) supplied to the fuel cell 2 is smaller than that during the normal electric power generation (in other words, smaller than that at least during the electric power generation at ordinary temperature), and the electric power loss is larger than that during the normal electric power generation (in other words, the power generation in which the electric power loss is larger than that at least during the electric power generation at ordinary temperature), and the fuel cell 2 is operated in a state where an air stoichiometric ratio is reduced to, for example, about 1.0 (a theoretical value).

The fuel cell 2 can rapidly be warmed up by intentionally setting the electric power loss to be larger in this way. On the other hand, in the case of the normal electric power generation including at least the electric power generation at ordinary temperature, the fuel cell 2 is operated in a state where the air stoichiometric ratio is set to, for example, 2.0 or higher (a theoretical value) so that high electric power generation efficiency is obtained by suppressing the electric power loss. The controller 7 functions as an electric power generation controller which executes the electric power generation at low efficiency in which the volume of the reactant gas supplied to the fuel cell 2 is smaller than that during the normal electric power generation and the electric power loss is larger than that during the normal electric power generation, as needed.

Next, impedance measurement and the like will be described.

First, the controller 7 determines whether or not to diagnose the moisture state of the fuel cell 2 (hereinafter, the diagnosis timing) has come. At the diagnosis timing, the diagnosis is adequately performed also during the operation as well as, for example, at the end or start of the operation of the fuel cell system 1. The controller 7 of the present embodiment detects that an operation termination instruction of the fuel cell system 1 has been input, and determines that the diagnosis timing has come, by, for example, an OFF operation of an ignition switch by a driver of the vehicle 100, or the like.

The controller 7 measures an impedance of the fuel cell 2, and diagnoses the moisture state of the fuel cell 2 based on the measurement result. The controller 7 of the present embodiment samples, at a predetermined sampling rate, the FC voltage detected by the voltage sensor 72 and the FC current detected by the current sensor 73, and performs Fourier transformation processing (FFT calculation processing or DFT calculation processing) and the like. Then, the controller 7 measures the impedance of the fuel cell 2 by dividing an FC voltage signal after the Fourier transform processing by an FC current signal after the Fourier transform processing, or by any other processing.

Then, the controller 7 reads a reference impedance stored in a built-in reference impedance memory, and compares the read reference impedance with the measured impedance.

Here, the reference impedance is a reference value for determining whether or not the fuel cell 2 is in a dry state, and is obtained beforehand by experiments or the like. Specifically, the impedance for determining whether or not the fuel cell 2 is in the dry state is obtained by the experiments or the like, and this impedance is stored, after being mapped, in the reference impedance memory.

Moreover, the controller 7 compares an FC temperature detected by the temperature sensor 47 (hereinafter, the detected FC temperature) with a reference FC temperature stored in a built-in reference FC temperature memory. Here, the reference FC temperature is a determination reference value for determining whether or not the fuel cell 2 permits the electric power generation at low efficiency, and is obtained beforehand by experiments or the like. Specifically, the FC temperature for determining whether or not to permit the electric power generation at low efficiency is obtained by the experiments or the like, and this FC temperature is stored, after being mapped, in the reference FC temperature memory.

Next, a specific example of the control at starting on a cold day in the fuel cell system 1 of the present embodiment will be described.

First, it is determined whether or not an anode circulation piping line or the hydrogen pump 24 is clogged, or the cell stack of the fuel cell 2 is clogged at multi channels (e.g. substantially all the cells are clogged) (hereinafter, this determination will be referred to as "the anode flow path clogging determination 1"). Then, it is determined whether or not the cell stack of the fuel cell 2 is clogged in a small number of channels (a small number of cells are clogged) (hereinafter, this determination will be referred to as "the anode flow path clogging determination 2"). In accordance with these respective determination situations, the controller 7 switches appropriate starting operations. A process thereof will be shown below using a flow.

Figure 2:
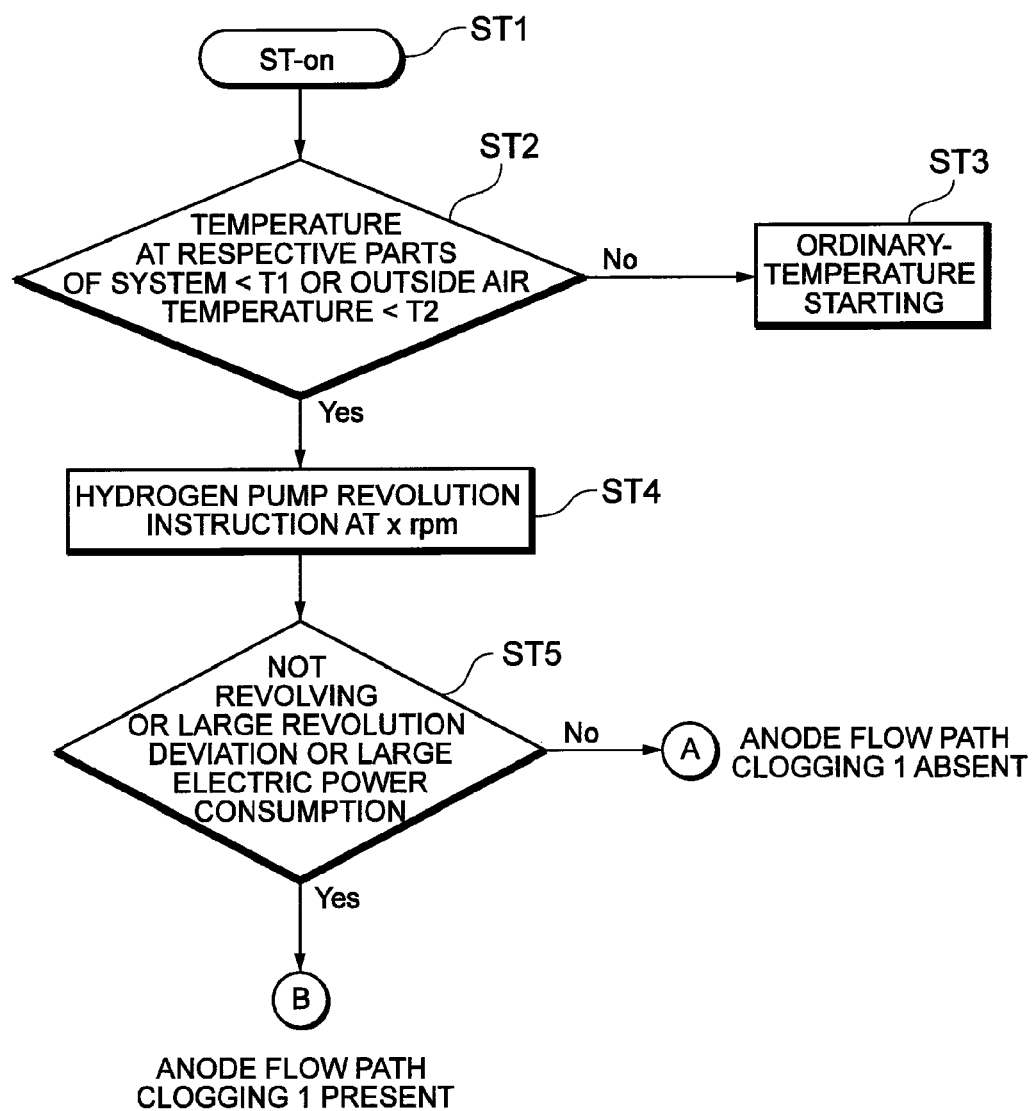
FIG. 2 is a flow chart showing a procedure of a control method at starting according to the present embodiment.

First, the anode flow path clogging determination 1 will be described with reference to FIG. 2. As shown in the flow of the chart, when a user starts a vehicle (step ST1), the controller 7 determines whether or not ordinary-temperature starting can be performed in the next step ST2. That is, the outside air temperature is estimated from the temperatures of the respective parts of the system, and it is determined that there is a possibility of freezing when the temperature is lower than a threshold value T1. Here, the outside air temperature is directly measured, and it may be determined that there is the possibility of the freezing when the outside air temperature is lower than a predetermined threshold value T2.

When it is determined in the step ST2 that there is not any possibility of the freezing, the ordinary-temperature starting (the normal starting) is initiated (step ST3). When it is determined that there is the possibility of the freezing, first a revolution instruction for driving the hydrogen pump 24 at a predetermined revolution number X is given to the pump in step ST4, and an actual revolution number of the hydrogen pump 24 is confirmed in step ST5.

When the hydrogen pump 24 revolves in accordance with the instruction value without any problem, it is not considered that significant clogging in the fuel gas piping system 4 and the fuel gas passage of the fuel cell 2 (hereinafter, these paths are generically referred to as "the anode flow path") arises, and hence it is determined that the anode flow path clogging determination 1 is negative (in this case, continuation is made from a sign A in FIG. 3, and the anode flow path clogging determination 2 is performed). In more detail, this determination can be made from a revolution deviation between the instructed revolution number and the actual revolution number, or a relationship between the instructed revolution number and electric power consumption.

Figure 4:
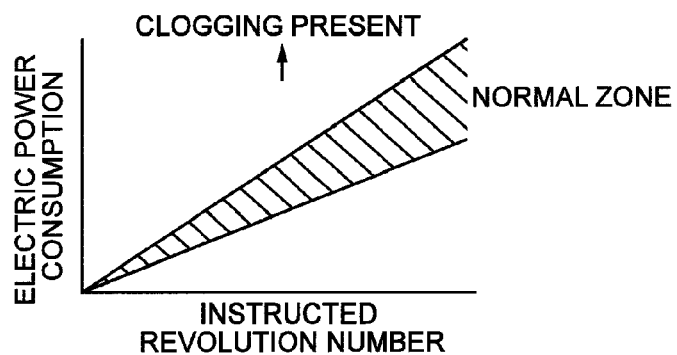
FIG. 4 is a diagram showing a map for determining clogging of an anode flow path.
Figure 5:
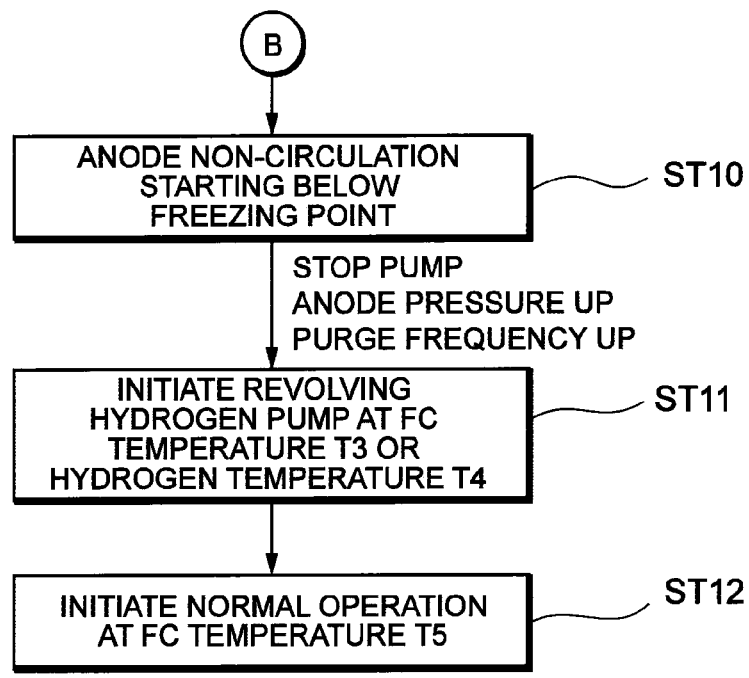
FIG. 5 is a flow chart showing a procedure of the control method at starting according to the present embodiment.

For example, the controller 7 retains beforehand a map shown in FIG. 4, determines that the hydrogen pump 24 does not revolve normally when the electric power consumption is larger than a specified value which is originally assumed in comparison with the instructed revolution number, considers that the clogging is remarkable, and advances to the next step (a flow B in FIG. 5).

Figure 8:
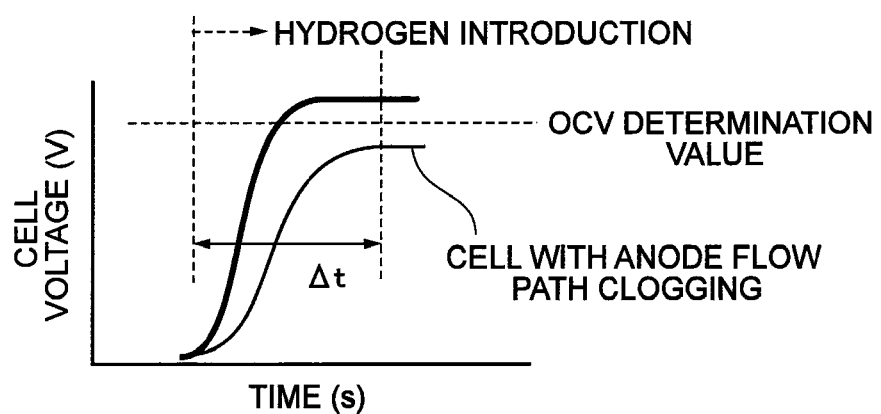
FIG. 8 is a diagram showing a map for determining clogging of a cell.

Moreover, as a modification example of the anode flow path clogging determination 1, it may be determined that the clogging arises when the cell voltage does not rise up to a predetermined OCV determination value during Δt after hydrogen introduction. As shown in FIG. 8, the cell voltage does not rise enough in the cell in which the fuel gas passage is clogged, and hence the presence/absence of the clogging can be determined. This clogging can be determined every cell.

Figure 3:
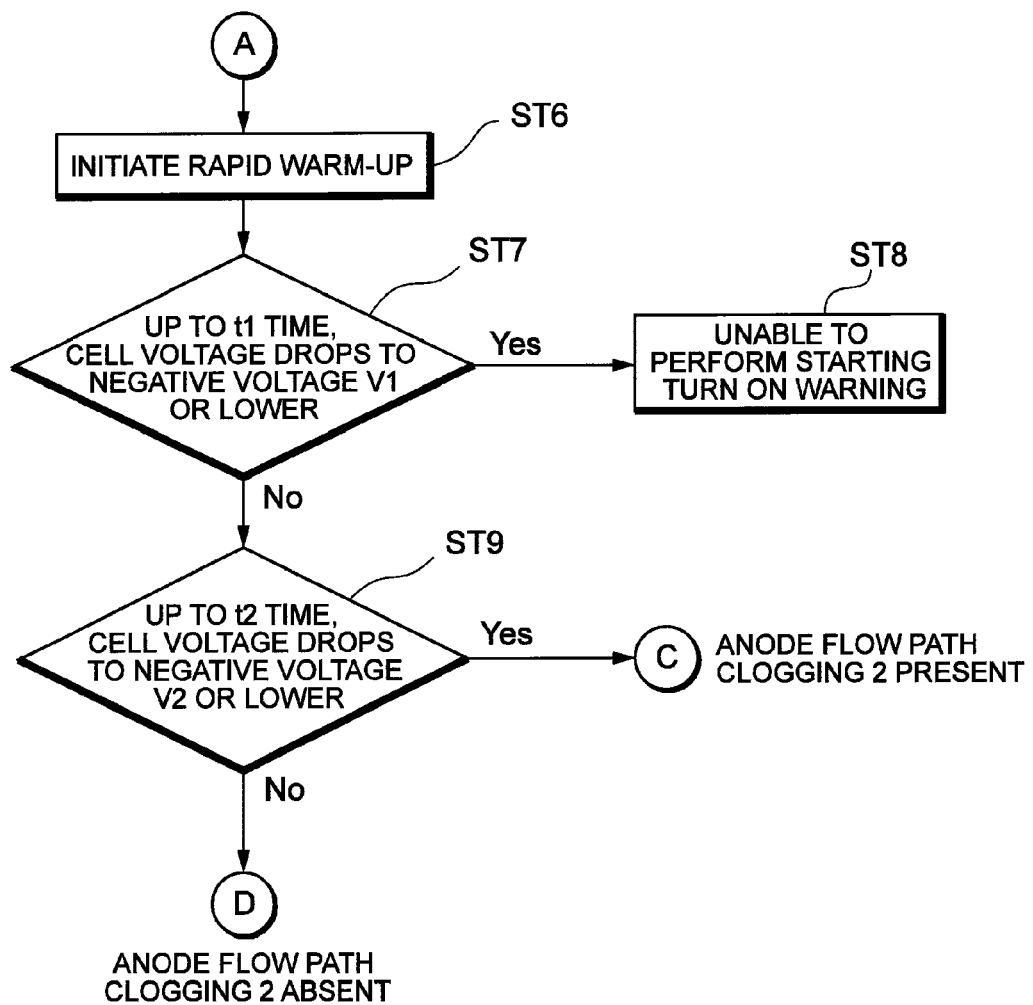
FIG. 3 is a flow chart showing a procedure of the control method at starting according to the present embodiment.

FIG. 3 is a flow chart showing the anode flow path clogging determination 2. When it is determined in the anode flow path clogging determination 1 that any significant clogging does not arise in the anode flow path, the anode flow path clogging determination 2 shown in this flow is successively performed.

First, normal starting below a freezing point (rapid warm-up) is performed in which the fuel cell 2 is operated in a state where an air stoichiometric ratio is limited to about 1.0 while revolving the hydrogen pump 24 (step ST6). Then, the cell voltage is monitored until a predetermined starting propriety determination time t1 elapses, and a warning is displayed as being unable to make starting when the cell voltage drops to a negative voltage V1 or lower (steps ST7 and ST8). Consequently, the clogging on the inlet side of the fuel cell 2 is determined.

Next, the cell voltage is measured until a predetermined clogging determination time t2 (t2>t1) elapses. A clogged cell is in a state rich in nitrogen, and hence a negative voltage is generated. From this fact, it is measured whether or not there is a cell whose cell voltage drops to a negative voltage V2 or less, and it is determined in that case that the clogging arises in part of the cell stack (step ST9). In this case, continuation is made to a flow C in FIG. 6.

On the other hand, when the determination of the step ST9 is negative, it is considered that the clogging does not arise in the anode flow path, and the normal starting below the freezing point is initiated. In this case, continuation is made to a flow D in FIG. 7.

Figure 6:
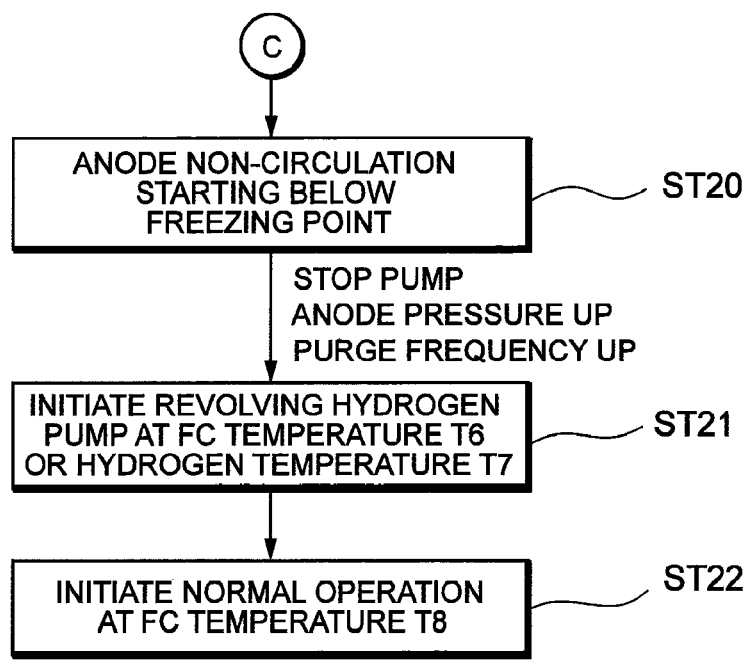
FIG. 6 is a flow chart showing a procedure of the control method at starting according to the present embodiment.
Figure 7:
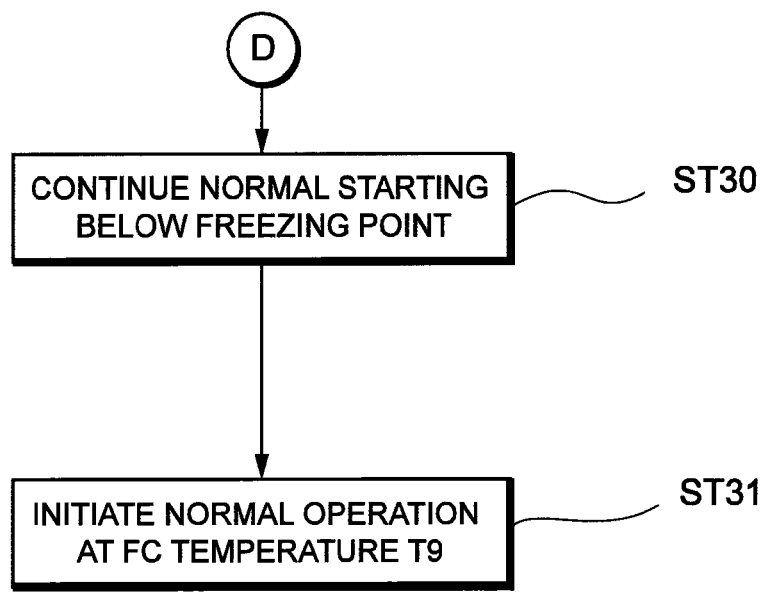
FIG. 7 is a flow chart showing a procedure of the control method at starting according to the present embodiment.

Each situation is determined in this way, and the starting by the respective flows shown in FIG. 5 through FIG. 7 is performed in accordance with this situation. Hereinafter, a case classified every determined situation will be described.

(B) A case where it is determined by the anode flow path clogging determination 1 that the significant clogging arises in the anode flow path (FIG. 5):

In this case, anode non-circulation starting below the freezing point is initiated (ST10). That is, the rapid warm-up operation is performed in a state where the hydrogen pump 24 is stopped and an anode pressure is increased (moreover, a purge frequency is increased). Consequently, the significant clogging due to the freezing in the anode flow path is resolved by pressure and heat.

When the temperature at which it is considered that the clogging is resolved to some extent is reached, i.e., when a stack temperature reaches a predetermined temperature T3 or a hydrogen pump temperature reaches a predetermined temperature T4, the hydrogen pump 24 is revolved (ST11).

Then, when the stack temperature further rises to reach a predetermined temperature T5 (T5>T3), the normal operation is initiated (ST12).

(C) A case where it is determined in the anode flow path clogging determination 2 that the clogging arises in a small number of cells (FIG. 6):

Also in this case, the anode non-circulation starting below the freezing point is initiated (ST20). That is, the rapid warm-up operation is performed (continued) in a state where the hydrogen pump 24 is stopped and the anode pressure is increased (moreover, the purge frequency is increased). Consequently, the clogging due to the freezing in the small number of cells is resolved by the pressure and heat.

When the temperature at which it is considered that the clogging is resolved to some extent is reached, i.e., when the stack temperature reaches a predetermined temperature T6 (T6≤T3) or the hydrogen pump temperature reaches a predetermined temperature T7 (T7≤T4), the hydrogen pump 24 is revolved (ST21).

Then, when the stack temperature further rises to reach a predetermined temperature T8 (T8>T6), the normal operation is initiated (ST22).

(D) A case where the anode flow path clogging 2 does not arise (FIG. 7):

In this case, the normal starting below the freezing point which has been initiated in the step ST6 is continued as it is (ST30).

Then, when the stack temperature rises to reach a predetermined temperature T9, the air stoichiometric ratio which has been reduced to about 1.0 until that time is set to, for example, 2.0 or higher, and the normal operation is initiated (ST31).

In the above, the stack temperatures T5, T8 and T9 at which the normal operation is initiated have a relationship of:

$$T5 \geq T8 \geq T9.$$

That is, the warm-up operation is continued until the fuel cell 2 reaches a higher temperature, when a degree of the clogging is more remarkable.

As described above, in the present embodiment, conditions for shifting to the normal operation, in other words, termination conditions of the rapid warm-up operation are changed in accordance with the clogging state, and hence starting time can become shortest by optimizing the time to stop the operation of the hydrogen pump 24 in accordance with the clogging state. Therefore, startability of the fuel cell 2 can be enhanced while suppressing the deterioration of durability.

It is to be noted that the timing to revolve the hydrogen pump 24 may be determined from an elapsed time after the starting, a temperature estimated from the amount of the heat generated by the stack, a generated current value, or a change in pressure during purging (the pressure drops properly because the clogging is resolved).

Further in the above, since the rapid warm-up operation is performed in a state where the hydrogen pump 24 is stopped when the anode flow path clogging 1 and the anode flow path clogging 2 arise, the electric power generation is non-uniformly performed meanwhile, a temperature distribution enlarges, and the durability of the fuel cell 2 might be disadvantageously influenced. Thus, in order to suppress the deterioration of the durability, the amount of the heat to be generated by the stack, and an absolute value and an increase rate of the generated current of the stack may be limited.

Moreover, in the case where the clogging has arisen in the anode flow path at the starting below the freezing point, it can be considered that a scavenging operation, performed at the stop of the operation previously (e.g. on the day before), was not sufficient. Here, the scavenging operation means that processing of removing remaining moisture in the fuel cell 2 is performed by discharging the moisture in the fuel cell 2 to the outside when the electric power generation of the fuel cell 2 is stopped. For example, the oxidation gas is supplied to the supply path 11 from the compressor 14 in a state where the supply of the hydrogen gas to the fuel cell 2 is stopped.

Thus, in the case where the clogging arises in the anode flow path at the starting below the freezing point as described above, remaining water may be decreased so as to be capable of avoiding the freezing until the next starting, by shifting the scavenging operation at the stop of the operation to be performed next in such a direction as to further dry the inside of the fuel cell 2. Specifically, it is possible to take measures such as the performing of the scavenging operation for a longer time, and the changing of the threshold value of the impedance in a case where the remaining water is measured from the impedance.

Moreover, in the case where the scavenging operation is performed as described above, when a remaining capacity of the secondary battery is insufficient, electric power required for the scavenging operation cannot be obtained from the secondary battery, which causes a possibility that the scavenging is insufficiently performed.

Thus, in such a case, a target temperature during the operation of the fuel cell before the scavenging operation is raised, to raise the temperature at the termination. In the case where the temperature of the fuel cell during the scavenging operation is high, drying is quickly performed, and hence drying scavenging is enabled even when electric energy for the scavenging is low.

The processing is performed, for example, as follows.

First, the temperature and charge amount of the secondary battery are acquired before the stop of the operation. Next, the electric energy which can be used for the scavenging operation (the electric energy available for the scavenging) is calculated by referring to a map from the acquired temperature and charge amount, or the like.

Then, in accordance with the electric energy available for the scavenging, a target temperature (Tt1) during the normal operation is raised, as the electric energy available for the scavenging becomes lower.

Moreover, when a situation occurs where a predetermined output cannot be obtained because of the situation of the secondary battery, for example, malfunction, also the output of the fuel cell is limited, and the scavenging is insufficiently performed also in such a case. Consequently, the following determinations are performed.

First, the electric energy available for the scavenging is acquired from the temperature of the secondary battery. Then, in accordance with the electric energy available for the scavenging, a target temperature (Tt2) during the normal operation is raised, as the electric energy available for the scavenging becomes lower.

A higher temperature of the operation target temperatures Tt1 and Tt2 calculated in this way is adopted as an actual target temperature during the operation.

Furthermore, instead of operating the fuel cell 2 toward the target temperature, a target impedance of the fuel cell 2 may be raised. That is, the drying scavenging is enabled even when the electric energy for the scavenging is low, as described above, by raising the target impedance in the case where the charge amount of the secondary battery is small, instead of raising the temperature of the fuel cell.

Furthermore, a target moisture content of the fuel cell 2 may be lowered, instead of operating the fuel cell 2 toward the target temperature. That is, the drying scavenging is enabled even when the electric energy for the scavenging is low, as described above, by decreasing the target moisture content in the case where the charge amount of the secondary battery is small, instead of raising the temperature of the fuel cell. The moisture content of the fuel cell 2 is generally calculated based on the impedance or another numeric value.

DESCRIPTION OF REFERENCE NUMERALS

1 Fuel cell system
2 Fuel cell
7 Controller (clogging determination unit, rapid warm-up controller, and scavenging controller)
24 Hydrogen pump (anode gas circulating pump)

The invention claimed is:

1. A fuel cell system comprising:
   a fuel cell stack which is supplied with a fuel gas and an oxidation gas to generate electric power by an electrochemical reaction;
   an oxidation gas piping system which supplies the oxidation gas to the fuel cell stack; and
   a fuel gas piping system which supplies the fuel gas to the fuel cell stack,
   the fuel gas piping system including a supply path through which the fuel gas to be supplied to the fuel cell stack from a fuel gas supply source flows; a circulation path which returns a fuel off-gas discharged from the fuel cell stack to the supply path; and a circulating pump which feeds under pressure the fuel off-gas in the circulation path to the supply path,
   the fuel cell system being capable of, at starting below a freezing point, selectively performing a rapid warm-up operation to generate the electric power at a stoichiometric ratio between the oxidation gas and the fuel gas lower than that at starting at ordinary temperature, while revolving the circulating pump, the fuel cell system further comprising;
   a clogging determination unit which determines, at the starting below freezing point, whether or not clogging arises from freezing in a fuel gas passage of the fuel cell stack, or the fuel gas piping system, while revolving the circulating pump; and
   a rapid warm-up controller which, when it is determined by the clogging determination unit during the rapid warm-up operation that the clogging arises, is programmed to stop the circulating pump, and to change restarting conditions of the circulating pump in accordance with at least three degrees of the clogging.

2. The fuel cell system according to claim 1, wherein termination conditions of the rapid warm-up operation are changed in accordance with a degree of the clogging.

3. The fuel cell system according to claim 1, wherein the rapid warm-up controller continues to operate the circulating pump until the fuel cell stack reaches a higher temperature, when a degree of the clogging is larger.

4. The fuel cell system according to claim 2, wherein the rapid warm-up controller continues the rapid warm-up operation until the fuel cell stack reaches a higher temperature, when the degree of the clogging is larger.

5. The fuel cell system according to claim 3, wherein the degree of the clogging is determined by judging whether or not the circulating pump revolves normally, when a revolution instruction is given to the circulating pump.

6. The fuel cell system according to claim 5, wherein the degree of the clogging is determined by a drop in cell voltage of the fuel cell stack, when the rapid warm-up operation is performed.

7. The fuel cell system according to claim 1, wherein the rapid warm-up controller limits an amount of heat to be generated by the fuel cell stack, and an absolute value and an increase rate of a generated current of the fuel cell stack, while the circulating pump is stopped.

* * * * *